June 19, 1923.
M. P. RODOPULOS
ICE CREAM SCOOP
Filed March 13, 1922
1,459,638
2 Sheets-Sheet 1
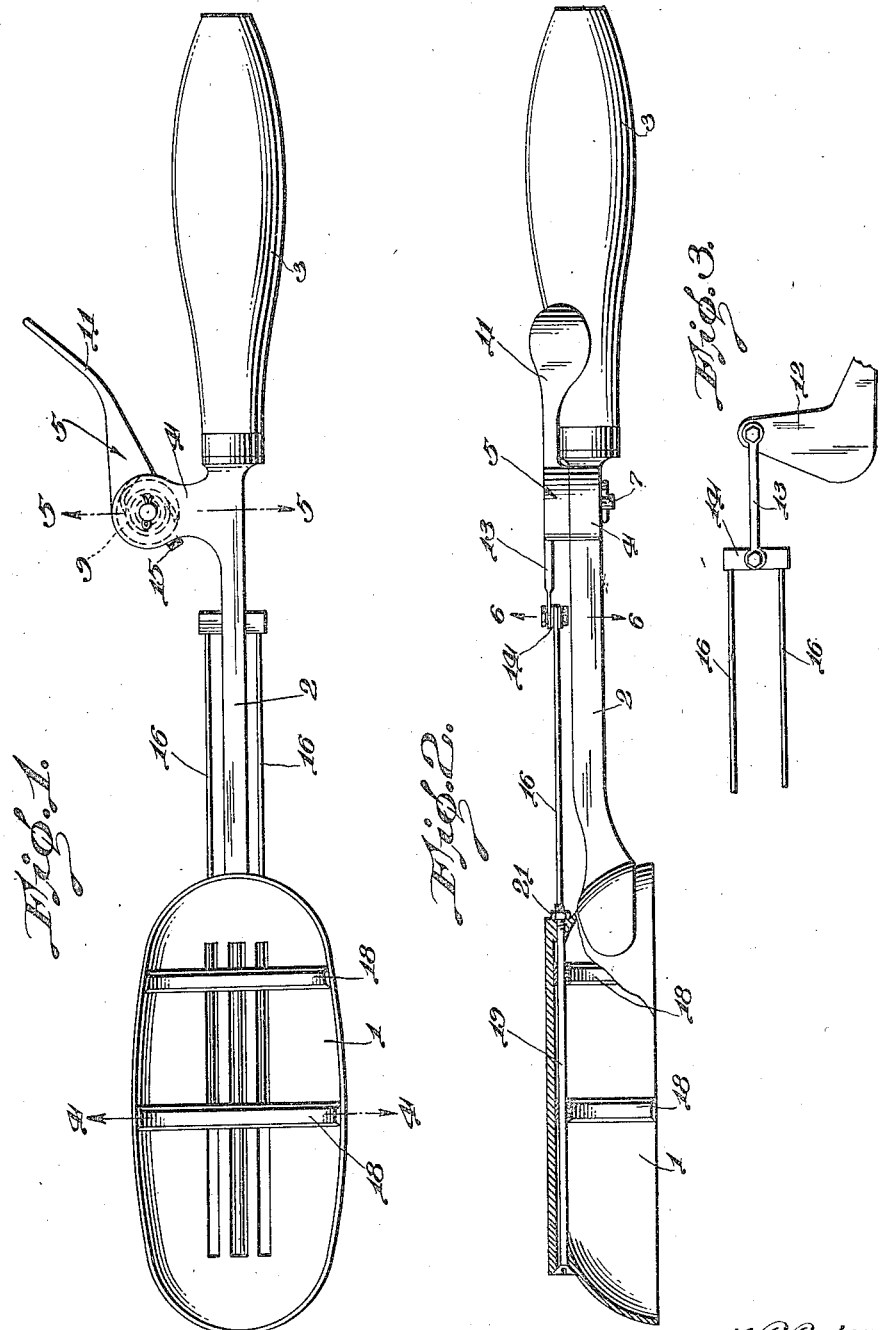
M. P. Rodopulos
INVENTOR
BY Victor J. Evans
ATTORNEY June 19, 1923. 1,459,638
M. P. RODOPULOS
ICE CREAM SCOOP
Filed March 13, 1922   2 Sheets-Sheet 2
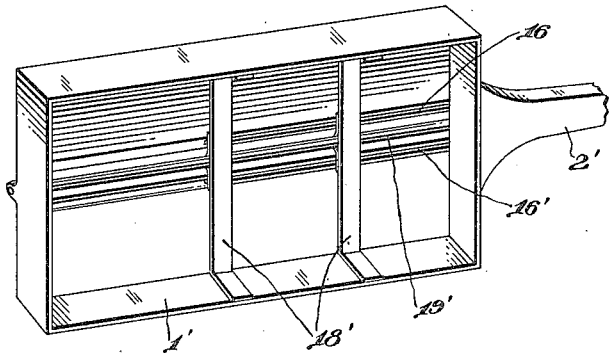
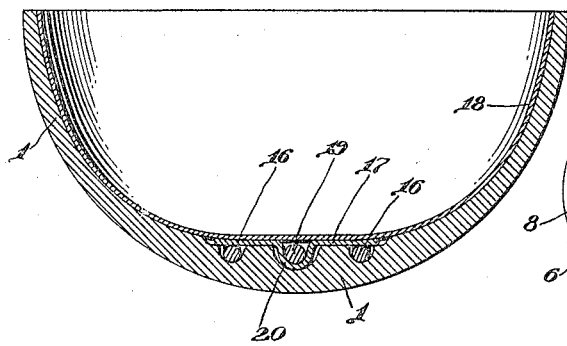
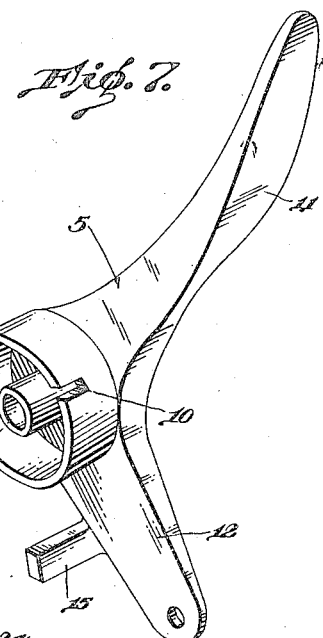
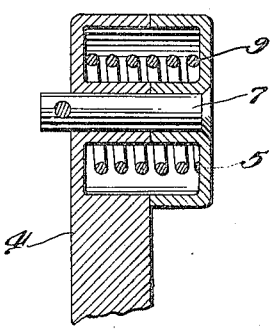
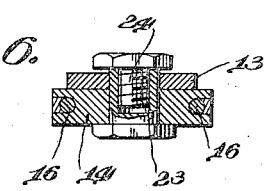
M. P. Rodopulos
INVENTOR
BY Victor J. Evans
ATTORNEY Patented June 19, 1923.

1,459,638

UNITED STATES PATENT OFFICE.

MICHAEL P. RODOPULOS, OF CHICAGO, ILLINOIS.

ICE-CREAM SCOOP.

Application filed March 13, 1922. Serial No. 543,308.

*To all whom it may concern:*

Be it known that I, MICHAEL P. RODOPULOS, a citizen of the United States, residing at Chicago, in the county of Cook and State of Illinois, have invented new and useful Improvements in Ice-Cream Scoops, of which the following is a specification.

This invention relates to a scoop or dipper for measuring and dispensing ice cream or analogous material, and an object of the invention is to provide a scoop designed for use in making fancy confectionery dishes such as banana splits, lovers' delights, or the like, the said scoop being shaped to provide the desired shape to the ice cream and add to the appearance of the confection.

Another object of this invention is to provide an ice cream scoop or dipper as specified in which a plurality of cutters are provided which are movable longitudinally of the scoop proper, for cutting the ice cream, ices, or analogous confections free from the scoop, the said cutters being operated by a suitable operating lever.

Other objects of the invention will appear in the following detailed description taken in connection with the accompanying drawings wherein:

Fig. 1 is a plan view of the improved scoop or dipper.

Fig. 2 is a side elevation partly in longitudinal section through the scoop or dipper.

Fig. 3 is a fragmentary plan of a part of the dipper structure.

Fig. 4 is a cross section through the scoop or dipper taken on the line 4—4 of Fig. 1.

Fig. 5 is a detail section taken on the line 5—5 of Fig. 1.

Fig. 6 is a detail section taken on the line 6—6 of Fig. 2.

Fig. 7 is a detail perspective view of the operating lever.

Fig. 8 is a perspective view of a modified form of the dipper.

Referring more particularly to the drawings, wherein like characters indicate like or corresponding parts throughout the several views, the improved scoop or dipper comprises the body 1 which is illustrated in the drawings as oblong in shape, the preferred form illustrated in Figs. 1 to 7 inclusive being oval and designed primarily for the forming of various confections such as banana splits, lovers' delights, etc., and it is carried by a handle 2 having a hand grip 3 mounted thereon. The handle 2 has a laterally projecting extension 4 formed thereon to which a lever structure 5 is pivotally connected. The lever structure 5 comprises the barrel 6 which engages over the pivot pin 7 and the casing 8 which includes a spiral spring 9 one end of which is connected to the extension 4 while the other end extends through an opening 10 in the casing 8. A handle 11 is formed upon the lever structure 5 for pivotally moving it against the tension of the spring 9 and an arm 12 is formed thereon which is connected by means of a link 13 to a cross bar 14. A suitable stop 15 is carried by the arm 12 for arresting or limiting the return movement of the handle 11 to its normal position under action of the spring 9. A pair of rods 16 are connected to the cross bar 14 and they extend through the cup or body 1, as clearly shown in Fig. 4 of the drawings.

The rods 16 are connected, by means of soldering or otherwise to straps 17 which are in turn soldered or otherwise suitably connected to the flexible cutters 18. The flexible cutters 18 are positioned within the cup or body 1 and are movable longitudinally therein by pivotal movement of the lever structure 5 for cutting confections free from the body or cup. A suitable guide rod 19 extends longitudinally of the cup or body 1, and the straps 17 are curved outwardly as shown at 20 and extend about the guide rod 19, and causing the positioning of the rod between the straps 17 and the cutters 18 as clearly shown in Fig. 4 of the drawings. The guide rod 19 which serves to bind the cutters in proper place is removable, being held in its proper position relative to the body or cup 1 by means of a nut 21 threaded upon the threaded end of the guide rod.

The rods 16 are connected in any suitable manner with the cross bar 14 such as by placing them in recesses at the ends of the cross bar and the cross bar is in turn connected to the link 13 by means of the hollow internally threaded bolt 23 and the stud bolt 24 and they are threadably engaged as clearly shown in Fig. 6 of the drawings.

In Fig. 8 of the drawings a slight modification of the scoop or dipper is shown in which the body 1' is rectangular in shape being designed principally for making ice cream sandwiches, or the like, and the body 1' is carried by a handle 2', and it has cutters 18' movable therein, by means of rods 16' and a guide rod 19'. The modified form is similar to the preferred form in all respects with the exception of its shape.

It is, of course, to be understood that the invention may be constructed in other manners and the parts associated in other relations and, therefore, I do not desire to be limited in any manner except as set forth in the claims hereunto appended.

Having thus described my invention what I claim is:

1. In an ice cream scoop or dipper, a scoop body, a handle attached thereto, a flexible cutter extending transversely of the body and movable longitudinally of the body, a lever carried by said handle, a pair of rods pivotally connected to said lever, and connected to said cutter for moving the cutter longitudinally of the the body upon pivotal movement of the lever.

2. In an ice cream scoop or dipper, a scoop body, a handle attached thereto, a flexible cutter extending transversely of the body and movable longitudinally of the body, a lever carried by said handle, a pair of rods pivotally connected to said lever, and connected to said cutter for moving the cutter longitudinally of the body upon pivotal movement of the lever, and a guide rod carried by said body for guiding movement of said cutter.

3. In an ice cream scoop or dipper, an oblong body, a handle attached thereto, a plurality of flexible cutters extending transversely of the body, a lever pivotally carried by the handle, a cross bar, a link connection between said cross bar and lever, a pair of rods carried by said cross bar, straps attached to said rods and to said cutters for moving the cutters upon movement of the lever.

4. In an ice cream scoop or dipper, an oblong body, a handle attached thereto, a plurality of flexible cutters extending transversely of the body, a lever pivotally carried by the handle, a cross bar, a link connection between said cross bar and lever, a pair of rods carried by said cross bar, straps attached to said rods and to said cutters for moving the cutters upon movement of the lever, a guide rod carried by said body, said straps extended about said guide rod whereby the latter will guide movement of said cutters.

In testimony whereof I affix my signature.

MICHAEL P. RODOPULOS.